United States Patent
Kawase et al.

(10) Patent No.: US 11,521,766 B2
(45) Date of Patent: Dec. 6, 2022

(54) WIRE-HARNESS ELECTRIC WIRE LENGTH CORRECTING DEVICE, AND WIRE HARNESS PRODUCING DEVICE

(71) Applicant: Hitachi Metals, Ltd., Tokyo (JP)

(72) Inventors: Kenji Kawase, Tokyo (JP); Raifu Yamamoto, Tokyo (JP); Katsuju Aoki, Tokyo (JP); Takumi Kobayashi, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 599 days.

(21) Appl. No.: 16/459,273

(22) Filed: Jul. 1, 2019

(65) Prior Publication Data

US 2020/0020465 A1 Jan. 16, 2020

(30) Foreign Application Priority Data

Jul. 12, 2018 (JP) .............................. JP2018-132513

(51) Int. Cl.
*H01B 13/012* (2006.01)
*B60R 16/02* (2006.01)
(Continued)

(52) U.S. Cl.
CPC ... *H01B 13/01236* (2013.01); *B60R 16/0207* (2013.01); *H01B 13/01209* (2013.01); *H01B 13/344* (2013.01); *H01R 43/28* (2013.01)

(58) Field of Classification Search
CPC . B60R 16/0207; G06F 2113/16; G06F 30/00; H01B 13/01209; H01B 13/01227
See application file for complete search history.

(56) References Cited

U.S. PATENT DOCUMENTS 5,899,373 A * 5/1999 Kamei .................. B65H 51/10
226/110
9,257,808 B1 2/2016 Guglielmo et al.
(Continued)

FOREIGN PATENT DOCUMENTS

CN 107887083 A 4/2018
CN 108011317 A 5/2018
(Continued)

OTHER PUBLICATIONS

European Office Action, dated Oct. 2, 2020, in European Application No. 19 183 668.3-1201.
(Continued)

*Primary Examiner* — Minh N Trinh
(74) *Attorney, Agent, or Firm* — McGinn I.P. Law Group, PLLC.

(57) ABSTRACT

A wire harness electric wire length correcting device, which corrects a design value of an electric wire length of an electric wire included in a wire harness, includes an electric wire identifying means including an identification mark, which is attached to an end portion of the electric wire, and which is to be cut off from the electric wire when the wire harness is installed on an installation target object, so as to use the identification mark to identify which electric wire an end cut off from the electric wire has been cut off from, a measuring means for measuring a length of the cut off end, and a correcting means for, for the electric wire identified by the electric wire identifying means, correcting the design value of the electric wire length of that electric wire, based on the length of the cut off end measured by the measuring means.

16 Claims, 5 Drawing Sheets

(51) Int. Cl.
*H01B 13/34* (2006.01)
*H01R 43/28* (2006.01)

(56) References Cited

U.S. PATENT DOCUMENTS

| | | | |
|---|---|---|---|
| 10,141,087 B2 | 11/2018 | Rougier et al. | |
| 2016/0064121 A1 | 3/2016 | Rougier et al. | |
| 2018/0088550 A1* | 3/2018 | Kawase | ............... B23D 33/006 |
| 2020/0020465 A1* | 1/2020 | Kawase | .............. B60R 16/0207 |

FOREIGN PATENT DOCUMENTS

| | | |
|---|---|---|
| EP | 0 967 122 A2 | 12/1999 |
| EP | 3 301 688 A1 | 4/2018 |
| JP | H01-102814 A | 4/1989 |
| JP | 4815456 B2 | 11/2011 |

OTHER PUBLICATIONS

Extended European Search Report dated Nov. 22, 2019 for European Patent Application No. 19183668.3-1201.
Chinese Office Action, dated Apr. 29, 2022, in Chinese Application No. 201910591013.3 and English Translation thereof.

* cited by examiner

172 WORK RECIPE INFORMATION

| | From | | | | | To | | | | | length | Cable Part No. |
|---|---|---|---|---|---|---|---|---|---|---|---|---|
| | Area label | Side | X | Y | Ring mark | Ring mark | X | Y | Side | Area label | | |
| 1 | Heater A | A | 100 | 320 | 1 824A | 1 824A | 5100 | 320 | C | Heater C | 5000 | ***** |
| 2 | Heater A | A | 100 | 320 | 2 825A | 2 825A | 5100 | 320 | C | Heater C | 5000 | ***** |
| 3 | Heater B | A | 1300 | 850 | 3 800RA | 3 800RA | 5100 | 320 | C | Heater C | 4000 | ***** |
| ⋮ | ⋮ | ⋮ | ⋮ | ⋮ | ⋮ | ⋮ | ⋮ | ⋮ | ⋮ | ⋮ | ⋮ | ⋮ |

WIRE-HARNESS ELECTRIC WIRE LENGTH CORRECTING DEVICE, AND WIRE HARNESS PRODUCING DEVICE

CROSS-REFERENCE TO RELATED APPLICATION

The present invention is based on Japanese Patent Application No. 2018-132513 filed on Jul. 12, 2018, the entire contents of which are incorporated herein by reference.

BACKGROUND OF THE INVENTION

1. Field of the Invention

The present invention relates to a wire harness electric wire length correcting device, a wire harness producing device, a wire harness electric wire length correcting method, and a wire harness producing method.

2. Description of the Related Art

A wire harness, which is used for a train or the like, is configured as a plurality of electric wires bundled together. In producing the wire harness, each electric wire is cut to a preset electric wire length, and laid out along a full scale drawing or image, and a component to be attached is attached to a predetermined position of the laid out electric wire or the electric wire bundle (see e.g. US Patent Application Publication No. 2016/0064121 A1).

[Patent Document 1] US Patent Application Publication No. 2016/0064121 A1

SUMMARY OF THE INVENTION

Now, in designing the wire harness, it is often the case that a design value of the electric wire length of each electric wire is configured to be longer (a surplus length portion of each electric wire is configured to be longer). This is provided for suppressing the occurrence of a shortage of the electric wire length of each electric wire, in the event of a later change in an installation condition, such as a design alteration and the like (e.g., a position alteration of a device with the wire harness connected thereto and the like). However, typically, the surplus length portion of the electric wire is designed to be cut off and discarded, and when no such change in the installation condition as described above occurs, the surplus length portion of the electric wire configured to be longer will be wasted. In this manner, the conventional wire harness is wastefully used, which leads to an increase in cost.

Accordingly, it is an object of the present invention to provide a wire harness electric wire length correcting device, a wire harness producing device, a wire harness electric wire length correcting method, and a wire harness producing method, which are capable of electric wire correction to a proper electric wire length.

For the purpose of solving the above-described problem, the present invention provides a wire harness electric wire length correcting device, which corrects a design value of an electric wire length of an electric wire included in a wire harness, the device comprising: an electric wire identifying means including an identification mark, which is attached to an end portion of the electric wire, and which is to be cut off from the electric wire when the wire harness is installed on an installation target object, so as to use the identification mark to identify which electric wire included in the wire harness an end cut off from the electric wire has been cut off from; a measuring means for measuring a length of the cut off end; and a correcting means for, for the electric wire identified by the electric wire identifying means, correcting the design value of the electric wire length of that electric wire, based on the length of the cut off end measured by the measuring means.

Further, for the purpose of solving the above-described problem, the present invention provides a wire harness producing device, comprising: a design information storing section, which stores therein work recipe information including a design value of an electric wire length of an electric wire included in a wire harness; an electric wire cutting machine, which cuts the electric wire to a length set at the design value of the electric wire length; and the above defined wire harness electric wire length correcting device, with the correcting means to correct the design value of the electric wire length stored in the design information storing section as the work recipe information.

Further, for the purpose of solving the above-described problem, the present invention provides a wire harness electric wire length correcting method, which is for correcting a design value of an electric wire length of an electric wire included in a wire harness, the method comprising: attaching an identification mark to an end portion of the electric wire, to cut off that identification mark from the electric wire when the wire harness is installed on an installation target object, so as to use the identification mark to identify which electric wire included in the wire harness an end cut off from the electric wire has been cut off from; measuring a length of the cut off end of the electric wire; and for the identified electric wire, correcting the design value of the electric wire length of that electric wire, based on the measured length of the cut off end.

Further, for the purpose of solving the above-described problem, the present invention provides a wire harness producing method, including: prestoring work recipe information including a design value of an electric wire length of an electric wire included in a wire harness, to cut the electric wire to a length set at the design value of the electric wire length; and correcting the design value of the electric wire length in the work recipe information by the above defined wire harness electric wire length correcting method.

POINTS OF THE INVENTION

According to the present invention, it is possible to provide the wire harness electric wire length correcting device, the wire harness producing device, the wire harness electric wire length correcting method, and the wire harness producing method, which are capable of electric wire correction to a proper electric wire length.

DETAILED DESCRIPTION OF THE PREFERRED EMBODIMENT

Embodiment

An embodiment of the present invention will be described below with reference to the attached drawings.

Wire Harness Producing Device

Figure 1:
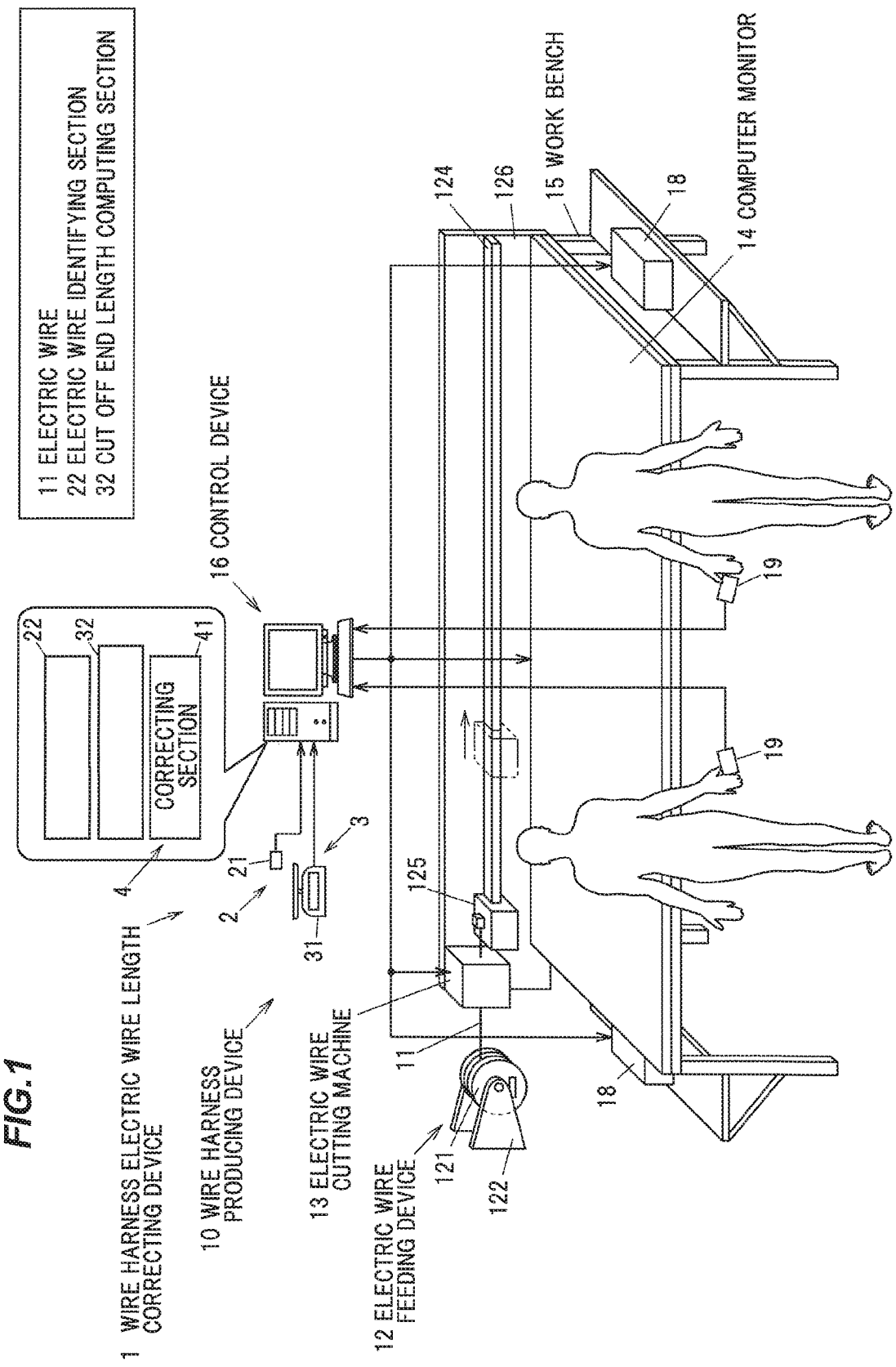
FIG. 1 is a schematic configuration diagram showing a wire harness producing device according to an embodiment of the present invention.
Figure 2:
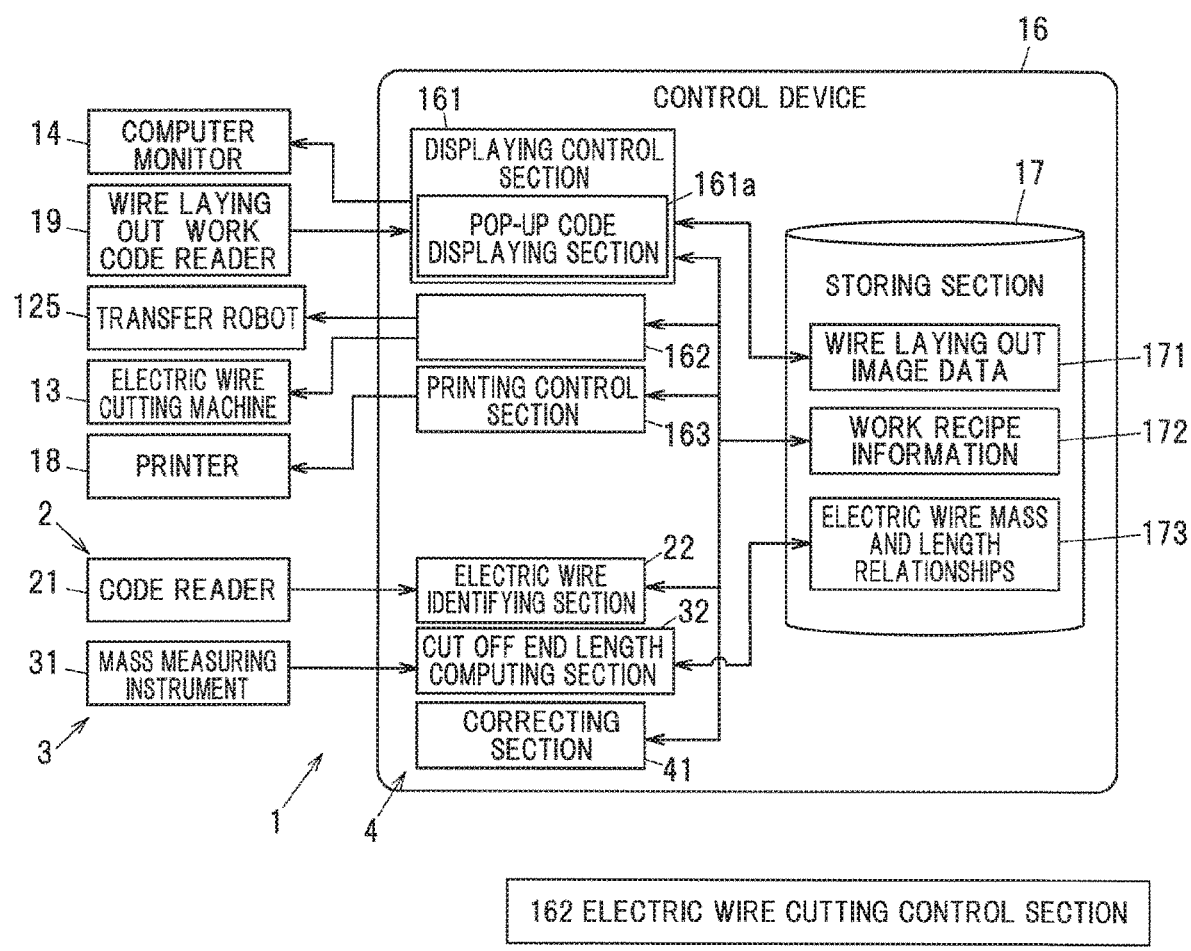
FIG. 2 is a block diagram showing inputs and outputs of a control device.

FIG. 1 is a schematic configuration diagram showing a wire harness producing device 10 according to the present embodiment. A wire harness produced in the present embodiment is designed to be used for an inter-device wiring of a train, for example. FIG. 2 is a block diagram showing inputs and outputs of a control device.

As shown in FIG. 1, the wire harness producing device 10 is configured to include an electric wire feeding device 12, an electric wire cutting machine 13, which cuts an electric wire 11 fed from the electric wire feeding device 12, a work bench 15 including a computer monitor 14 to display a full size wire laying out image, and a control device 16, which performs a control on the electric wire feeding device 12 and the electric wire cutting machine 13, and a displaying control on the computer monitor 14, and the like.

The electric wire feeding device 12 is configured to include a reel 121 with that electric wire 11 being wound therearound, a support member 122, which rotatably supports the reel 121, and a transfer robot 125 to hold a tip of that electric wire 11 fed from the reel 121, run on a rail 124, and transfer (draw out) that electric wire 11. The rail 124 is configured to be provided in a longitudinal direction and above the work bench 15 and fixed to the work bench 15 via a support plate 126. The electric wire cutting machine 13 is configured to use a built-in cutting blade (not shown), to cut that electric wire 11 drawn out by the transfer robot 125.

The work bench 15 is configured as a bench for an electric wire 11 laying out work to be performed to produce the wire harness, and configured to be provided with the computer monitor 14 on its top surface, such as a liquid crystal display or the like to display a full size wire laying out image. Note that, for example, when the wire harness as long as several tens of meters is produced, the computer monitor 14 may be configured as a plurality of the displays 14 arranged side by side. In addition, in order to protect the computer monitor 14, a protective plate made of a transparent member such as acrylic or the like may be placed over the computer monitor 14. A wire harness production is performed by, in turn, arranging (laying out) the electric wires 11 cut by the electric wire cutting machine 13 along the wire laying out image displayed on the computer monitor 14, and subsequently performing tape winding, protective material mounting, and the like.

The control device 16 is designed to perform a control on the electric wire feeding device 12 and the electric wire cutting machine 13, and a displaying control on the computer monitor 14, and the like, and is configured as an appropriate combination of a computing element, a memory, an interface, a hard disk, a software and the like. In the present embodiment, the control device 16 is configured to use a personal computer.

The control device 16 is configured to include a storing section 17 that stores wire laying out image data 171, work recipe information 172, and the like. The wire laying out image data 171 is configured as image data for the wire laying out image to be displayed on the computer monitor 14. The work recipe information 172 is configured as a time series database with information on the electric wires 11 arranged in a laying out order of those electric wires 11.

Figure 3:
FIG. 3 is a diagram showing one example of work recipe information.

As shown in FIG. 3, in the work recipe information 172, e.g., for each of both end portions (From and To) of each electric wire 11, an area label (Area label) indicating a connection destination, a side (Side) indicating a position of each end portion, coordinate information (X and Y) indicating a display position of a pop-up bar code described later, a ring mark number (Ring mark) described later, and the like are configured. Further, in the work recipe information 172, a respective design value (length) of an electric wire length of each electric wire 11 and types (Cable Part No.) of those electric wires 11 are configured. Note that the specific contents of the work recipe information 172 are not limited to the foregoing but can appropriately be configured.

As shown in FIG. 2, the control device 16 is configured to include a displaying control section 161, which performs a displaying control on the computer monitor 14 of the work bench 15, an electric wire cutting control section 162, which performs a cutting control on those electric wires 11, and a printing control section 163, which performs a printing control on identification marks to be attached to the end portions respectively of those electric wires 11. The control device 16 is configured in such a manner that the computer monitor 14 of the work bench 15, a wire laying out work code reader 19, the transfer robot 125, the electric wire cutting machine 13, and printers 18 are being connected to the control device 16.

The displaying control section 161 is configured to display, on the computer monitor 14, a full-size wire laying out image of each constituent electric wire of the wire harness, based on the wire laying out image data 171 stored in the storing section 17. In the present embodiment, the displaying control section 161 is configured to include a pop-up code displaying section 161a. The pop-up code displaying section 161a is configured to create a bar code (pop-up bar code) to be able to identify the electric wire 11 currently being laid out based on the work recipe information 172, and display that created bar code in coordinates designated according to the coordinate information of the work recipe information 172 in the computer monitor 14. Since that electric wire 11 has the two end portions, the present embodiment is being designed to display the bar codes adjacent to both the end portions, respectively, of that electric wire 11 in the computer monitor 14. Note that the pop-up code displaying section 161a may be configured to prestore the bar code image information in the work recipe information 172, and act to retrieve that bar code image information and display the bar codes in the designated coordinates. Further, the pop-up code displaying section 161a may be configured to display two-dimensional codes other than the bar codes.

The electric wire cutting control section 162 is configured to use the electric wire feeding device 12 and the electric wire cutting machine 13, to perform a cutting control to cut that electric wire 11 to a specified length. The electric wire cutting control section 162 is configured to retrieve the type of that electric wire 11 to be cut and the design value of the electric wire length of that electric wire 11 from the work recipe information 172, and act to draw out that electric wire 11 of the retrieved type by a predetermined length with the transfer robot 125, and cut that drawn out electric wire 11 with the electric wire cutting machine 13. This results in that electric wire 11 having the length designated according to the design value of the electric wire length. Note that, although that electric wire 11 is configured as a linear shape conductor covered with an insulator around its outer periphery, that electric wire 11 may, as with a LAN cable, integrally be configured in such a manner that a plurality of linear conductors are covered with insulators around their outer peripheries respectively, and then covered together with an outer sheath. Here, the insulators are made of an insulating resin and may be configured as one layer or a plurality of layers. The outer sheath may be formed by solid extrusion to fill the spaces between the insulators or may be formed in a tubular shape.

The printing control section 163 is configured to perform a printing control on the identification marks to be attached to both the end portions, respectively, of that electric wire 11, and print the identification marks with the printers 18, respectively, connected thereto. In the present embodiment, the printers 18 are configured to be disposed on both the end portions, respectively, of the work bench 15, so as to attach the identification marks to both the end portions, respectively, of that electric wire 11 (see FIG. 1). Further, the present embodiment is being designed to use each printer 18 to print a ring mark 181 as the identification mark and a mark tape 182 with a two-dimensional code (QR code (registered trademark)) 182a attached thereto to be able to identify that electric wire 11.

Figure 4:
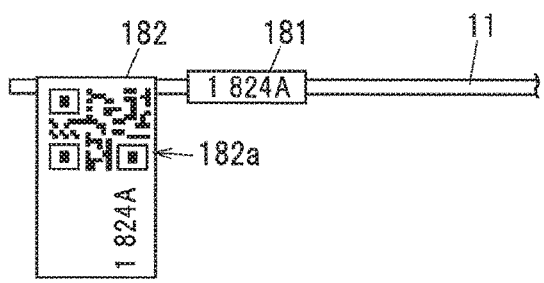
FIG. 4 is a diagram showing an end portion of an electric wire with a ring mark and a mark tape attached thereto.

As shown in FIG. 4, the ring marks 181 and the mark tapes 182 printed by the printers 18 are configured to be attached to both the end portions, respectively, of each electric wire 11. In the present embodiment, the mark tapes 182 are configured in such a manner that the two-dimensional codes 182a are being printed on the mark tapes 182 respectively, but may be configured in such a manner that the bar codes are printed on the mark tapes 182 respectively. The ring marks 181 and the mark tapes 182 are used for the electric wire 11 inquiry during wire harness production (wire laying out work), and for the electric wire 11 identification during installation (rigging) on a train and the like. Further, the mark tapes 182 are designed to constitute a part of an electric wire identifying means of the present invention, and are also used to identify which electric wire 11 a cut off end resulting from the electric wire 11 cutting during rigging has been cut off from.

Note that, although in the present embodiment, the ring marks 181 and the mark tapes 182 are being used as the identification marks, the ring marks 181 may be omitted, while only the mark tapes 182 may be used, for example. Furthermore, it is naturally possible to use an IC tag, an RFID tag or the like, as the identification mark.

The displaying control section 161 is configured to display a wire laying out image on the computer monitor 14, at the start of the wire harness production, when an operator identification code owned by an operator is scanned by the wire laying out work code reader 19, for example. At this point of time, the pop-up code displaying section 161a is configured to look up the work recipe information 172 and display the bar codes for that electric wire 11 being first laid out in the designated coordinates of the computer monitor 14. Further, the electric wire cutting control section 162 is configured to look up the work recipe information 172 and cut that electric wire 11 being first laid out to a specified electric wire length. Further, the printing control section 163 is configured to look up the work recipe information 172, and print, with the printers 18, the ring marks 181 and the mark tapes 182 for that electric wire 11 being first laid out. The operator lays out that electric wire 11 along the wire laying out image displayed on the computer monitor 14 and attaches the ring marks 181 and the mark tapes 182 to both the end portions, respectively, of that electric wire 11.

After the first electric wire 11 laying out, with the wire laying out work code reader 19, the operator scans the two-dimensional codes 182a attached to the mark tapes 182 and the bar codes displayed on the computer monitor 14. When the two-dimensional codes 182a attached to the mark tapes 182 and the bar codes displayed on the computer monitor 14 are scanned by the wire laying out work code reader 19, the displaying control section 161 acts to determine having completed the first electric wire 11 laying out, and display the bar codes for the next electric wire 11 on the computer monitor 14. At this point of time, the electric wire cutting control section 162 acts to look up the work recipe information 172 and cut the electric wire 11 being next laid out to a specified electric wire length. Further, the printing control section 163 acts to look up the work recipe information 172 and print, with the printers 18, the ring marks 181 and the mark tapes 182 for that electric wire 11 being next laid out. The wire harness production (wire laying out work) is performed by repeating the work described above. The completion of the wire laying out work is followed by the steps of tape winding and protective material mounting. This results in the wire harness.

Wire Harness Electric Wire Length Correcting Device

The wire harness producing device 10 is configured to be provided with a wire harness electric wire length correcting device 1 according to the present embodiment. The wire harness electric wire length correcting device 1 is configured as a device for correcting the design value of the electric wire length used in producing the wire harness, for each of the plurality of electric wires 11 included in the wire harness.

In the wire harness, in order to address the occurrence of later design alteration and the like, the design value of the electric wire length of each electric wire 11 is configured to be longer. For that reason, in performing an actual wire harness installing work on an installation target object such as a train and the like along a predetermined installation path, the end portions of those electric wires 11 are cut to be adjusted to a proper length, so that the wire harness connecting work to a device and the like are performed. The wire harness electric wire length correcting device 1 according to the present embodiment is designed to utilize a cut off end of each electric wire 11 produced in actual wire harness installation, to subsequently correct the electric wire length of each electric wire 11 in the wire harness to be produced to a proper length.

The wire harness electric wire length correcting device 1 is configured to include an electric wire identifying means 2, a measuring means 3, and a correcting means 4.

The electric wire identifying means 2 is configured to include the identification marks (herein, the mark tapes 182), which are attached to the end portions, respectively, of the plurality of electric wires 11, and which are to be cut off from those electric wires 11 when the wire harness is installed on an installation target object, so as to use the identification marks (the mark tapes 182) to identify which electric wire included in the wire harness an end cut off from each electric wire 11 has been cut off from. Although the mark tapes 182 are originally designed to be used for the electric wire 11 inquiry during wire harness production (wire laying out work), and for the electric wire 11 identification during installation on a train and the like, the wire harness electric wire length correcting device 1 according to the present embodiment is being designed to utilize these mark tapes 182 to identify which electric wire 11 the cut off end resulting from the electric wire 11 cutting has been cut off from.

The electric wire identifying means 2 is configured to include a code reader 21 to scan the two-dimensional codes 182*a* attached to the mark tapes 182, and an electric wire identifying section 22 to identify the electric wires 11 based on the code information of the two-dimensional codes 182*a* scanned by the code reader 21. The code reader 21 is configured to be connected to the control device 16, while the electric wire identifying section 22 is configured to be mounted on the control device 16. Note that the code reader 21 and the wire laying out work code reader 19 may be configured as a common code reader.

In the present embodiment, the code information of the two-dimensional codes 182*a* is configured to include the information for electric wire 11 identification (such as ring mark 181 numbers and the like) and the information on the types of the electric wires 11 and the like, so that the electric wire identifying section 22 is configured to extract the information for electric wire 11 identification and the information on the types of the electric wires 11 from the code information, to thereby perform the identification of the electric wires 11 and the identification of the types of the electric wires 11. It should be noted, however, that the configuration of the electric wire identifying section 22 is not limited to the foregoing, but the electric wire identifying section 22 may be configured to, based on the information included in the two-dimensional codes 182*a* (the information for electric wire 11 type identification), look up the work recipe information 172, and retrieve the information on the types of the electric wires 11 and the like. Further, the two-dimensional codes 182*a* may be configured to include information on which end portion of each electric wire 11 the cut off end resulting from the electric wire 11 cutting has been cut off from, so that the electric wire identifying section 22 may be configured to identify which end portion of each electric wire 11 the cut off end resulting from the electric wire 11 cutting has been cut off from.

The measuring means 3 is configured to measure a length of the cut off end of each electric wire 11. In the present embodiment, the measuring means 3 is configured to include a mass measuring instrument 31, which measures a mass (weight) of the cut off end of each electric wire 11, and a cut off end length computing section 32, which computes a length of the cut off end of each electric wire 11, based on the mass of the cut off end of each electric wire 11 measured by the mass measuring instrument 31. As the mass measuring instrument 31, it is desirable to use an electronic type mass measuring instrument capable of signal output associated with the measured mass of the cut off end of each electric wire 11. In the present embodiment, the mass measuring instrument 31 is configured to be connected to the control device 16, so that the signal associated with the mass of the cut off end of each electric wire 11 measured by the mass measuring instrument 31 is input to the control device 16. The cut off end length computing section 32 is configured to be mounted on the control device 16.

Figure 5:
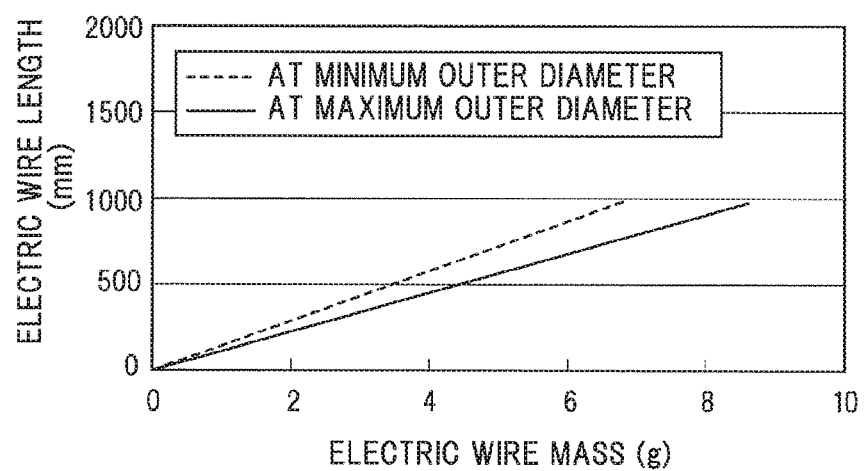
FIG. 5 is a diagram showing one example of electric wire mass and length relationships.

In the present embodiment, for each type of the electric wires 11, "electric wire mass and length relationships" 173 are configured to be prestored in the storing section 17. The "electric wire mass and length relationships" 173 may be configured to be expressed by a relation, or by a mapping. One example of the "electric wire mass and length relationships" 173 is shown in FIG. 5. As shown in FIG. 5, the relationships between the electric wire 11 mass and the electric wire 11 length are substantially proportional. In FIG. 5, in view of electric wire 11 outer diameter variations in production, there are shown the "electric wire mass and length relationships" 173 at the minimum electric wire 11 outer diameter and the maximum electric wire 11 outer diameter. Since evaluating the length of the cut off end of each electric wire 11 as being greater than the actual length thereof may cause a shortage of the electric wire 11 length, it is more desirable to use the "electric wire mass and length relationship" 173 at the maximum electric wire 11 outer diameter in view of the production tolerances, to determine the length of the cut off end of each electric wire 11.

The cut off end length computing section 32 is configured to compute the length of the cut off end of each electric wire 11, based on the mass of the cut off end of each electric wire 11 measured by the mass measuring instrument 31, the type of each electric wire 11 identified by the electric wire identifying means 2, and the "electric wire mass and length relationships" 173 prestored by the storing section 17. Herein, the cut off end length computing section 32 is configured to compute the length of the cut off end of each electric wire 11, based on the output value of the mass measuring instrument 31 during the code reader 21 scanning the two-dimensional codes 182*a*, in other words, the mass of the cut off end of each electric wire 11, and the "electric wire mass and length relationship" 173 associated with the type of each electric wire 11 identified by the electric wire identifying means 2. In the present embodiment, in order to save labor in the work, the measurement of the mass of the cut off end of each electric wire 11 is being performed by using the code reader 21 scanning of the two-dimensional codes 182*a* as a trigger. For the cut off ends of all the electric wires 11, the operator repeatedly performs the electric wire 11 cut off end setting in the mass measuring instrument 31 and the two-dimensional code 182*a* scanning with the code reader 21. Note that, for example, a button to serve as a trigger for the cut off end mass measurement may be provided in the mass measuring instrument 31, or the cut off end mass measurement may be performed by using the specified operation performed by the control device 16 as a trigger.

Further, although in the present embodiment, the measuring means 3 is configured to obtain the length of the cut off end of each electric wire 11 by measuring the mass of the cut off end of each electric wire 11 and converting the measured mass into the length, the electric wire 11 cut off end length obtaining method in the measuring means 3 is not limited to the foregoing. For example, the measuring means 3 may be configured to record the cut off end of each electric wire 11 with a camera and appropriately perform an image processing on the recorded cut off end of each electric wire 11 to thereby obtain the length of the cut off end of each electric wire 11. Alternatively, the length of each electric wire 11 may directly be measured by using an electronic gauge, and the like. It should be noted, however, that, from the point of view of simple and inexpensive system configuration, and quick measurement capability it is more desirable to use the method which measures the mass of the cut off end of each electric wire 11 to convert that mass to the length, as in the present embodiment.

A correcting section 41 to serve as the correcting means 4 is configured to be mounted on the control device 16, and is configured to correct the design value of the electric wire length of each electric wire 11 based on the length of the cut off end of each electric wire 11 obtained by the measuring means 3. In the present embodiment, the correcting section 41 is configured to correct the design value (length in FIG.

3) of the electric wire length of each electric wire 11 in the work recipe information 172. More specifically, the correcting section 41 is configured to store, in the work recipe information 172, a corrected electric wire length design value of each electric wire 11 obtained by subtracting the length of the cut off end of each electric wire 11 from the current design value of the electric wire length of each electric wire 11.

Note that the correction method with the correcting section 41 is not limited to the foregoing. For example, the correcting section 41 may be configured to subtract a value obtained by multiplying the length of the cut off end of each electric wire 11 by a predetermined coefficient of 1 or less, from the current design value of the electric wire length of each electric wire 11. This allows the electric wire 11 to be suppressed from becoming too short.

Further, the correcting section 41 may be configured to store, in the work recipe information 172, each of lengths (herein, referred to as correction lengths) corrected in both the end portions of each electric wire 11. Although, in the wire harness including a branched portion, it is desirable that lengths from that branched portion as well as the entire length of each electric wire 11 become a desired value, the lengths from that branch portion of each electric wire 11 can be adjusted to a proper length by storing in the work recipe information 172 the correction lengths of the respective two end portions of each electric wire 11. For example, by configuring the displaying control section 161 in such a manner that, during the wire laying out work of each electric wire 11, the correction lengths of both the end portions of each electric wire 11 are displayed (e.g., −10 cm and the like are displayed) on the wire laying out image displayed on the computer monitor 14, it is possible to set both the end portions of each electric wire 11 in proper positions, even without modifying the wire laying out image.

Although, in the present embodiment, the electric wire identifying section 22, the cut off end length computing section 32, and the correcting section 41 have been described to be mounted on the control device 16 of the wire harness producing device 10, the configuration thereof is not limited to the foregoing, but all or some of the electric wire identifying section 22, the cut off end length computing section 32, and the correcting section 41 may be mounted on a dedicated device separate from the control device 16. In this case, the electric wire length design value correction may be performed by connecting the control device 16 and that dedicated device via a network such as the Internet, an intranet or the like, and exchanging information between the control device 16 and that dedicated device via the network.

Control Flow of Wire Harness Electric Wire Length Correcting Device 1

Figure 6:
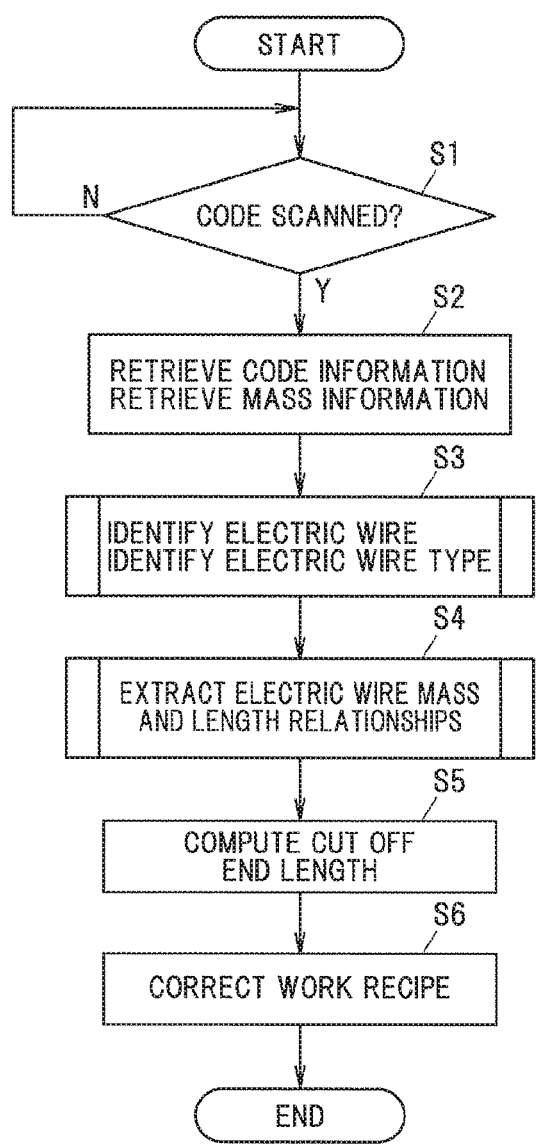
FIG. 6 is a flow chart showing a control flow of a wire harness electric wire length correcting device.

FIG. 6 is a flow chart showing a control flow for the wire harness electric wire length correcting device 1. In the wire harness electric wire length correcting device 1, for all the electric wire 11 cut off ends produced after installation (rigging) work, the electric wire length design value correction is performed by repeatedly performing the flow of FIG. 6.

As shown in FIG. 6, first, in step S1, the electric wire identifying section 22 determines as to whether the two-dimensional code of the mark tape 182 has been scanned with the code reader 21. If a No decision is made in step S1, the flow returns to step S1. If a Yes decision is made in step S1, the flow progresses to step S2.

In step S2, the electric wire identifying section 22 retrieves the code information of the two-dimensional code. Further, the cut off end length computing section 32 retrieves the mass information from the mass measuring instrument 31. Thereafter, in step S3, based on the code information retrieved in step S2, the electric wire identifying section 22 performs the identification of which electric wire 11 the cut off end has been cut off from, and the identification of the type of that electric wire 11.

Thereafter, in step S4, the cut off end length computing section 32 extracts the "electric wire mass and length relationships" 173 associated with the type of that electric wire 11 identified in step S3. Thereafter, in step S5, based on the mass information retrieved in step S2 and the "electric wire mass and length relationships" 173 extracted in step S4, the cut off end length computing section 32 computes the length of the cut off end of that electric wire 11.

Thereafter, in step S6, the correcting section 41 extracts the work recipe information 172 of that electric wire 11 identified in step S3, and subtracts the length of the cut off end of that electric wire 11 computed in step S5 from the design value of the electric wire length of that electric wire 11 in the work recipe information 172 to thereby compute a corrected electric wire length design value of that electric wire 11, and store that corrected electric wire length design value in the work recipe information 172. Thereafter, the cut off end processing of that electric wire 11 is ended, and the cut off end processing of the next electric wire 11 is started.

Operations and Advantageous Effects of the Embodiment

As described above, the wire harness electric wire length correcting device 1 according to the present embodiment is configured to include the electric wire identifying means 2 including the identification marks (herein, the mark tapes 182), which are attached to the end portions, respectively, of the plurality of electric wires 11, and which are to be cut off from those electric wires 11 when the wire harness is installed on the installation target object, so as to use the identification marks (the mark tapes 182) to identify which electric wire 11 included in the wire harness the end cut off from each electric wire 11 has been cut off from, the measuring means 3 for measuring the length of that cut off end; and the correcting means 4 for, for the electric wire 11 identified by the electric wire identifying means 2, correcting the design value of the electric wire length of that electric wire 11, based on the length of the cut off end measured by the measuring means 3.

This makes it possible to feed back the length of the wasted cut off end of the electric wire 11 to the design value and correct the electric wire length of the electric wire 11 to a proper length. This results in a decrease in scrap electric wire, and a decrease in scrap electric wire processing cost, thus making a wire harness cost lowering feasible. For example, in a train, since 10,000 or more electric wires 11 are being used, it can be said that eliminating the waste of the electric wires 11 has a profound effect. Further, since the electric wire length of each electric wire 11 is corrected to a proper length, when the wire harness is installed on the installation target object such as a train or the like, it is possible to omit the electric wire 11 end portion cutting off work, and thereby enhance the work efficiency of the wire harness installing work as well.

Furthermore, by using the wire harness producing device 10 equipped with the wire harness electric wire length correcting device 1, it is possible to employ such a method as to preset the somewhat longer design value of the electric wire length of the first electric wire 11, and after actual installation (rigging), adjust it to a proper electric wire length. For that reason, for example, even when the design of a train vehicle body to which the above method is applied is not perfect and the device location is not definitely predetermined, it is possible to perform wire harness design and production, and it is therefore easy to cope with a tight production schedule.

Summary of the Embodiments

Next, the technical ideas grasped from the above-described embodiments will be described with the aid of the reference characters and the like in the embodiments. It should be noted, however, that each of the reference characters and the like in the following descriptions is not to be construed as limiting the constituent elements in the claims to the members and the like specifically shown in the embodiments.

[1] A wire harness electric wire length correcting device (1), which corrects a design value of an electric wire length of an electric wire (11) included in a wire harness, the device comprising: an electric wire identifying means (2) including an identification mark (182), which is attached to an end portion of the electric wire (11), and which is to be cut off from the electric wire (11) when the wire harness is installed on an installation target object, so as to use the identification mark (182) to identify which electric wire (11) included in the wire harness an end cut off from the electric wire (11) has been cut off from; a measuring means (3) for measuring a length of the cut off end; and a correcting means (4) for, for the electric wire (11) identified by the electric wire identifying means (2), correcting the design value of the electric wire length of that electric wire (11), based on the length of the cut off end measured by the measuring means (3).

[2] The wire harness electric wire length correcting device (1) according to [1] above, wherein the identification mark (182) is attached to the end portion of the electric wire (11), which is configured as the cut off end.

[3] The wire harness electric wire length correcting device (1) according to [1] or [2] above, wherein the identification mark (182) includes a bar code or a two-dimensional code (182*a*), while the electric wire identifying means (2) includes a code reader (21) to scan the bar code or the two-dimensional code (182*a*).

[4] The wire harness electric wire length correcting device (1) according to any one of [1] to [3] above, wherein the measuring means (3) includes a mass measuring instrument (31), which measures a mass of the cut off end, and a cut off end length computing section (32), which computes the length of the cut off end based on the mass of the cut off end measured by the mass measuring instrument (31).

[5] The wire harness electric wire length correcting device (1) according to [4] above, wherein the electric wire identifying means (2) is configured to use the identification mark (182) and identify a type of the electric wire (11), while the measuring means (3) includes a storing section (17), which prestores "electric wire mass and length relationships" (173) therein for each type of the electric wires, with the cut off end length computing section (32) to compute the length of the cut off end based on the mass of the cut off end measured by the mass measuring instrument (31), the type of the electric wire (11) identified by the electric wire identifying means (2), and the "electric wire mass and length relationships" (173) prestored in the storing section (17).

[6] A wire harness producing device (10), comprising: a storing section (17), which stores therein work recipe information (172) including a design value of an electric wire length of an electric wire (11) included in a wire harness; an electric wire cutting machine (13), which cuts the electric wire (11) to a length set at the design value of the electric wire length; and the wire harness electric wire length correcting device (1) according to any one of [1] to [5] above, with the correcting means (4) to correct the design value of the electric wire length in the work recipe information (172).

[7] A wire harness electric wire length correcting method, which is for correcting a design value of an electric wire length of an electric wire (11) included in a wire harness, the method comprising: attaching an identification mark (182) to an end portion of the electric wire (11), to cut off that identification mark (182) from the electric wire (11) when the wire harness is installed on an installation target object, so as to use the identification mark (182) to identify which electric wire (11) included in the wire harness an end cut off from the electric wire (11) has been cut off from; measuring a length of the cut off end of the electric wire (11); and for the identified electric wire (11), correcting the design value of the electric wire length of that electric wire (11), based on the measured length of the cut off end.

[8] A wire harness producing method, including: prestoring work recipe information (172) including a design value of an electric wire length of an electric wire (11) included in a wire harness, to cut the electric wire (11) to a length set at the design value of the electric wire length; and correcting the design value of the electric wire length in the work recipe information (172) by the wire harness electric wire length correcting method according to [7] above.

Although the embodiments of the present invention have been described above, the above described embodiments are not to be construed as limiting the inventions according to the claims. Further, it should be noted that not all the combinations of the features described in the embodiments are indispensable to the means for solving the problem of the invention.

The present invention can appropriately be modified and implemented without departing from the spirit thereof. For example, although in the above described embodiments, the code reader 21 and the mass measuring instrument 31 are connected to the control device 16 so that the scanning of the code information and the measurement of the mass are performed directly by the control device 16, the scanning of the code information and the measurement of the mass may be performed by a device different from the control device 16. For example, the code reader 21 and the mass measuring instrument 31 may be connected to a mobile terminal such as a tablet or a notebook computer, and, based on the information scanned by the code reader 21 and the mass information scanned by the mass measuring instrument 31, a database may be created on the mobile terminal. In this case, the electric wire identifying section 22 may identify each electric wire 11 from the code information in the database, and the cut off end length computing section 32 may compute the length of the cut off end, based on the mass information in the database.

In addition, for example, although in the above embodiments, the identification marks (the mark tapes 182) are being attached to the cut off end sides of the electric wires 11 to be cut off from the electric wires 11 when the wire harness is installed on the installation target object, the identification marks (the mark tapes 182) may conversely be attached to the end portions of the electric wires 11 to remain after the cut off ends have been cut off.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A wire length correcting device, which corrects a design value of an electric wire length of a wire harness, the electric wire length correcting device comprising:
    identifying means including an identification mark, configured to attach to an end portion of the electric wire, and which is to be cut-off from the electric wire when the wire harness is installed on an installation target object, the identification mark identifying which electric wire included in the wire harness from which the electric wire has been cut-off from;
    measuring means for measuring a length of the cut-off end;
    correcting means adapted for the electric wire identified by the identifying means, correcting the design value of the electric wire length of that electric wire, based on the length of the cut-off end measured by the measuring means,
    wherein the cut-off end of the electric wire is designed to be discarded; and
    an electric wire cutting control section to result in an electric wire having the length designated according to the design value of the electric wire length,
    wherein the measuring means and the electric wire cutting control section constitute first and second measuring mechanisms to measure the length.

2. The wire length correcting device according to claim 1, wherein the identification mark is attached to the end portion of the electric wire, which is configured as the cut-off end.

3. The wire length correcting device according to claim 1, wherein the identification mark includes a bar code or a two-dimensional code, and the electric wire identifying means includes a code reader to scan the bar code or the two-dimensional code.

4. The wire length correcting device according to claim 1, wherein the measuring means includes:
    a mass measuring instrument which measures a mass of the cut-off end; and
    a cut-off end length computing section which computes the length of the cut-off end based on the mass of the cut-off end measured by the mass measuring instrument.

5. The wire length correcting device according to claim 4, wherein the electric wire identifying means is configured to use the identification mark and identify a type of the electric wire,
    wherein the measuring means includes a storing section which prestores electric wire mass and length relationships therein for each type of the electric wires,
    wherein the cut-off end length computing section computes the length of the cut-off end based on the mass of the cut-off end measured by the mass measuring instrument, the type of the electric wire identified by the electric wire identifying means, and the electric wire mass and length relationships prestored in the storing section.

6. The wire length correcting device according to claim 5, wherein for each type of the electric wires, the electric wire mass and length relationships are configured to be prestored in the storing section, such that the electric wire mass and length relationships are configured to be expressed by one of a relation and a mapping.

7. The wire length correcting device according to claim 6, wherein the electric wire mass and length relationships between the electric wire mass and the electric wire length are substantially proportional.

8. The wire length correcting device according to claim 6, wherein the electric wire mass and length relationships are provided at a minimum electric wire outer diameter and a maximum electric wire outer diameter.

9. The wire length correcting device according to claim 1, wherein the electric wire cutting control section performs a cutting control on the electric wires to minimize the length of the cut-off end.

10. The wire length correcting device according to claim 1, wherein the electric wire cutting control section is configured to perform a cutting control to cut the electric wire to a specified length, and
    wherein the electric wire cutting control section is configured to retrieve a type of the electric wire to be cut and the design value of the electric wire length of the electric wire, and act to draw-out the electric wire of the retrieved type by a predetermined length, and cut the drawn-out electric wire, thereby resulting in the electric wire having the length designated according to the design value of the electric wire length.

11. The wire length correcting device according to claim 1, wherein the correcting means is configured to store a corrected electric wire length design value of each electric wire obtained by subtracting the length of the cut-off end of each electric wire from a current design value of the electric wire length of each electric wire.

12. The wire length correcting device according to claim 1, wherein the correcting means extracts work recipe information of the electric wire identified by the identifying means, and subtracts the length of the cut-off end of the electric wire from the design value of the electric wire length of the electric wire in the work recipe information, thereby to compute a corrected electric wire length design value of the electric wire, and store the corrected electric wire length design value in the work recipe information.

13. The wire length correcting device according to claim 1, wherein the cut-off end comprises a target object employed to measure the length.

14. A wire harness producing device, comprising:
    a storing section, which stores therein work recipe information including a design value of an electric wire length of an electric wire included in a wire harness;
    an electric wire cutting machine, which cuts the electric wire to a length set at the design value of the electric wire length; and
    a wire length correcting device, which corrects the design value of the electric wire length of the wire harness, the electric wire length correcting device comprising:
    identifying means including, an identification mark, configured to attach to an end portion of the electric wire, and which is to be cut-off from the electric wire when the wire harness is installed on an installation target object the identification mark identifying which electric wire included in the wire harness from which the electric wire has been cut-off from;
    measuring means for measuring a length of the cut-off end;
    correcting means adapted for the electric wire identified by the identifying means, correcting the design value of the electric wire length of that electric wire, based on the length of the cut-off end measured by the measuring means, wherein the cut-off end of the electric wire is designed to be discarded; and an electric wire cutting control section to result in an electric wire having the length designated according to the design value of the electric wire length, wherein the measuring means and the electric wire cutting control section constitute first and second measuring mechanisms to measure the length according to claim 1, with the correcting means to correct the design value of the electric wire length in the work recipe information.

15. The wire harness producing device according to claim 14, wherein the correcting means is configured to store, in the work recipe information, a corrected electric wire length design value of each electric wire obtained by subtracting the length of the cut-off end of each electric wire from a current design value of the electric wire length of each electric wire.

16. The wire harness producing device according to claim 14, wherein the correcting means extracts the work recipe information of the electric wire identified by the identifying means, and subtracts the length of the cut-off end of the electric wire from the design value of the electric wire length of the electric wire in the work recipe information, thereby to compute a corrected electric wire length design value of the electric wire, and store the corrected electric wire length design value in the work recipe information.

* * * * *